March 13, 1945.  J. R. KEELING, JR  2,371,395

ELECTRICAL INSTRUMENT

Filed May 24, 1941

Inventor
JACK R. KEELING, JR.

By E. V. Hardway
Attorney

Patented Mar. 13, 1945

2,371,395

UNITED STATES PATENT OFFICE 2,371,395

ELECTRICAL INSTRUMENT

Jack R. Keeling, Jr., College Station, Tex.

Application May 24, 1941, Serial No. 395,117

2 Claims. (Cl. 175—183)

This invention relates to an electrical instrument.

An object of the invention is to provide a circuit having an alternating current constant that requires very little energy to change the constant and to measure minute changes in said constant whereby the circuit is applicable to practically every measurement involving dimensions or dimensional charges, electrical constants or changes in electrical constants where precision is important.

Another object is to provide a novel means for measuring linear displacements to an accuracy of better than one millionth of an inch.

With the above and other objects in view the invention has particular relation to certain novel features of construction, operation and arrangements of parts, an example of which is given in this specification and illustrated in the accompanying drawing, wherein.

Figure 1:
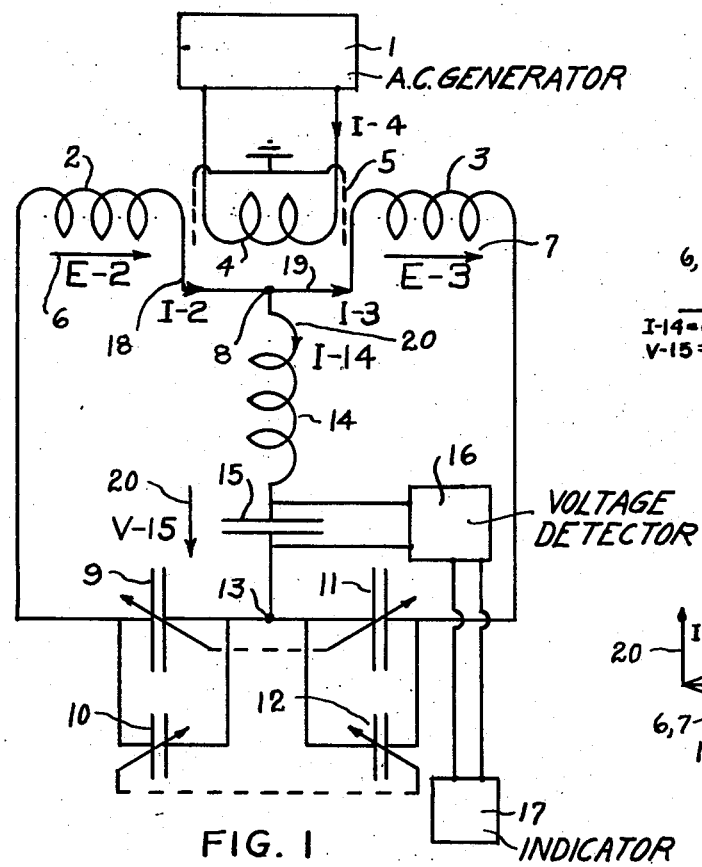
Figure 1 shows a circuit diagram of the instrument.

Referring now more particularly to the drawing wherein like numerals of reference designate similar parts in each of the figures, the numeral 1 designates an A. C. generator which supplies coil 4 with an alternating current of the resonant frequency. Coil 4 is electrostatically shielded to minimize electrostatic coupling of this coil and other portions of the circuit by means of electrostatic shield 5. Magnetic coupling is the more desirable method of transferring electrical energy to coils 2 and 3. The coils 2 and 3 are as nearly identical in electrical characteristics as possible and are coupled equally to coil 4 in order to have substantially equal electromotive forces E—2 and E—3, induced in them. The electromotive forces are in phase and their directions are shown on the drawing by the arrows designated by numerals 6 and 7.

One side of each of the coils 2 and 3 is connected to junction 8. One side of coil 2 is connected to condenser 9, and trimmer condenser 10 and one side of coil 3 is connected to condenser 11 and trimmer condenser 12. The coil 2, condenser 9 and trimmer 10 forms one variable branch and the coil 3, condenser 11 and trimmer 12 form the other variable branch. Coil 14 and condenser 15 form a resonant series branch which is independent of the variable branches. Therefore, between junctions 8 and 13 exist the three branches, with one fixed for resonance and the other two arranged to be at resonance when the circuit is balanced. Condensers 9 and 11 have a common moving element and likewise the trimmers 10 and 12 have a common moving element.

A voltage detector 16 is connected across a component of the fixed resonant branch, preferably condenser 15. In conjunction with voltage dectector 16 is an indicator 17 which indicates the energy in the fixed branch.

Figure 2:
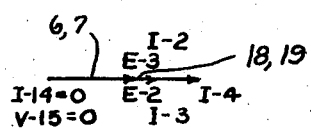
Figure 2 shows a vector diagram of the circuit at balanced condition.
Figure 3:
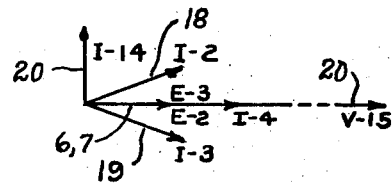
Figure 3 shows a vector diagram of the circuit at slightly unbalanced condition.

The voltages and currents are indicated by arrows in Figure 1 and vectors in Figures 2 and 3. The electromotive forces E—2 and E—3 induced in the coils 2 and 3 are shown at 6 and 7 respectively. The currents I—2, I—3, I—14 in coils 2, 3 and 14 respectively are shown at 18, 19, 20.

The operation will be hereinafter described. Generator 1 produces the alternating current in coil 4. Coils 2 and 3 have equal and in phase electromotive forces induced therein as a result of the current in coil 4. In the balanced condition the two variable branches of the circuit (with coil 2 and coil 3 as components) are identical. In this balanced state there exists no potential difference between junctions 8 and 13 and none of the energy delivered to the circuit is present in the center branch comprising coil 14 and condenser 15. The current I—14 and voltage V—15 are zero for the balanced condition. When the moving element of condensers 9 and 11 is displaced from the position of electrical balance, one condenser increases in capacity while the other decreases. The balance is thus upset and there develops a potential difference between junctions 8 and 13. Current I—14 and voltage V—15 arise from the electrically unbalance condition. The magnitude of the current I—14 is comparatively large for a given displacement because the middle branch has a minimum impedance. The voltage V—15 across the condenser is many times greater than the voltage across the entire branch because of resonance; therefore, a relatively large voltage V—15 results from a minute displacement from the balance position. The use of the resonant circuit for the middle branch increases the sensitivity about a thousand fold in practice. Voltage detector 16 and indicator 17 respond to the voltage V—15. The moving element of the trimmer condensers 10 and 12 is then displaced in such a direction to offset the displacement of the moving element of condensers 9 and 11. The amount of displacement required of the trimmer condensers moving element is proportional to the displacement of the moving element of the condensers 9 and 11 for small displacement. Thus by evaluating the displacement of the trimmer condensers 10 and 11 required to restore balance, the displacement producing unbalance is known. The null method of measuring is unnecessary when the voltage V—15 is evaluated suitably by the indicator 17.

In all the circuits hereinbefore explained, it will be noted that each circuit is composed of bilateral impedances, the energy source and the energy receiver, or indicator may be interchanged.

The drawing and description are illustrative merely while the broad principle of the invention will be defined by the appended claims.

What I claim is:

1. A device of the character described comprising three approximately resonant series branches, each branch being composed of capacitative and inductive reactors, said branches being connected in parallel, one of said branches being fixed and the other branches being adjustable, a generator coupled inductively to the two adjustable branches in a manner to excite each equally with an alternating current of the resonant frequency of the unexcited fixed branch, the excited adjustable branches having a double capacitor with an electrically common plate that increases one capacitance while decreasing the other capacitance as a result of a displacement of the electrically common plate, a volt meter connected to meter the voltage developed across a reactive member in the fixed branch which is proportional to the displacement of the electrically common plate for very small displacements.

2. A device of the character described comprising three approximately resonant series branches, each branch being composed of capacitative and inductive reactors, said branches being connected in parallel, one of said branches being fixed and the other branches being adjustable, a generator coupled inductively to the two adjustable branches in a manner to excite each equally with an alternating current of the resonant frequency of the unexcited fixed branch, the excited adjustable branches having a double capacitor with an electrically common plate that increases one capacitance while decreasing the other capacitance as a result of a displacement of the common plate, a volt meter connected to meter the voltage developed across a reactive member in the fixed branch that results from the movement of the common capacitator plate from the equal capacity position, an auxiliary twin capacitator connected in parallel with the first mentioned twin capacitor which can be manually adjusted by displacing its common plate to compensate for the displacement of the common plate of the first mentioned twin capacitor in order to use the volt meter as an indicator of exact compensation.

JACK R. KEELING, Jr.